Patented Aug. 6, 1946

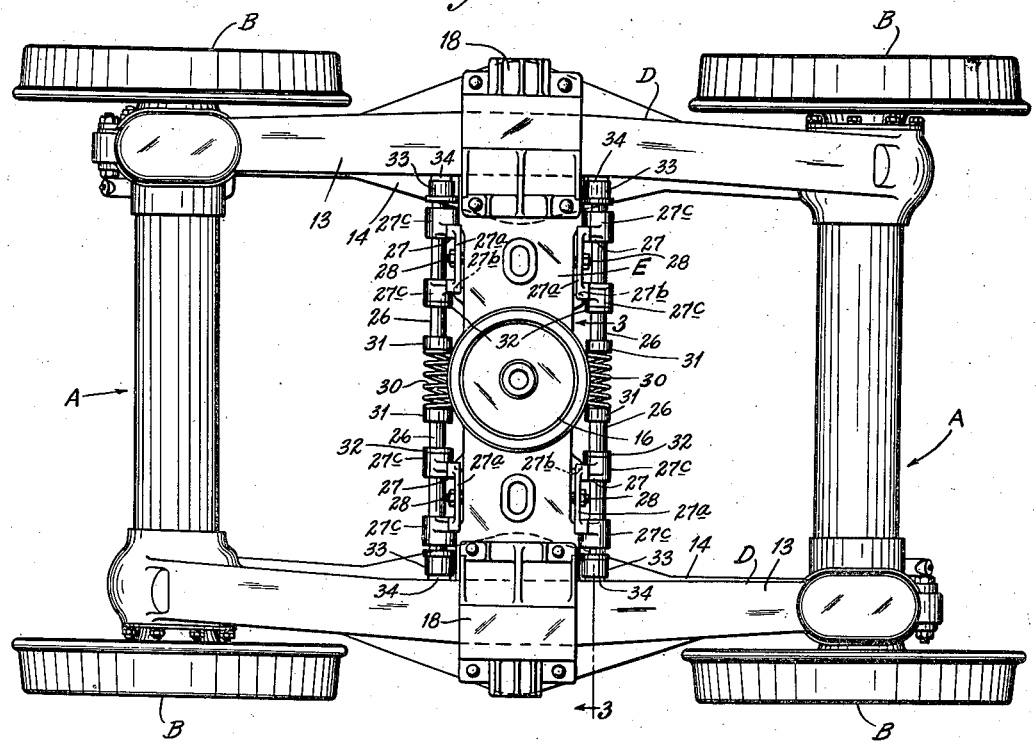
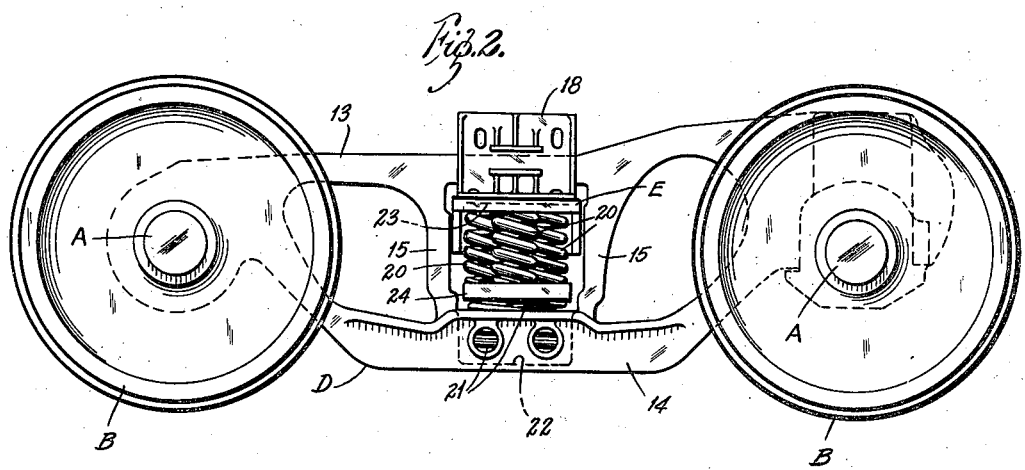

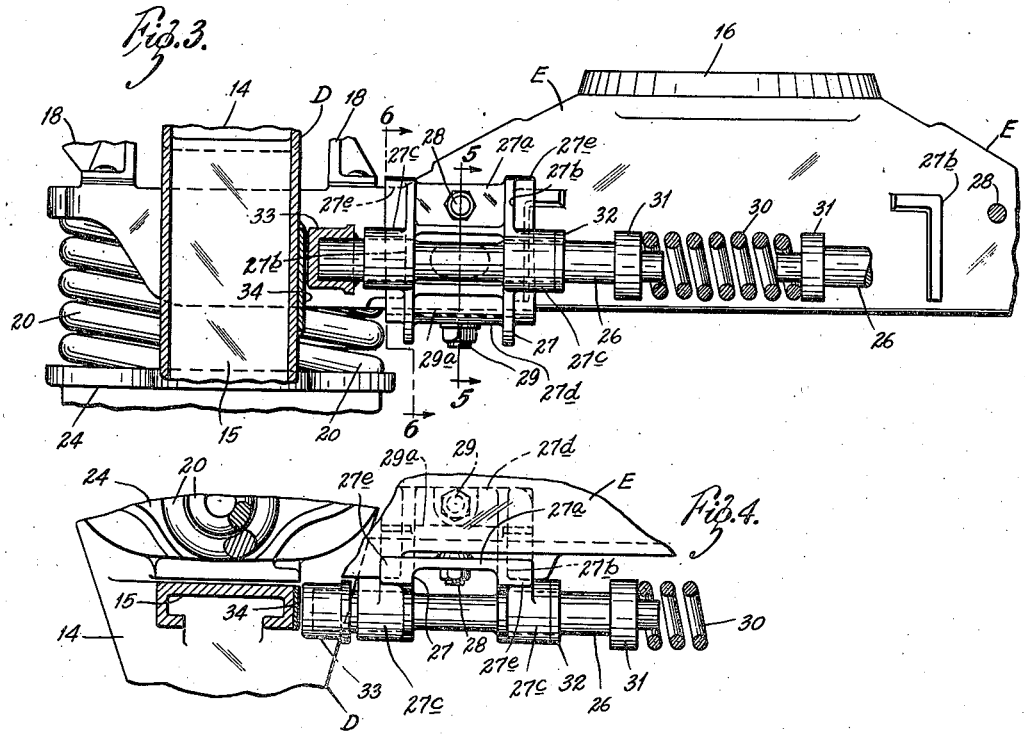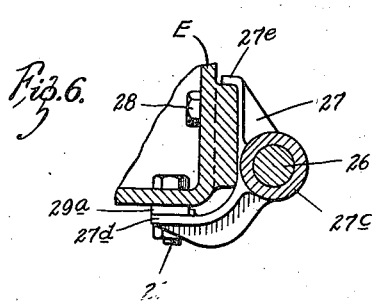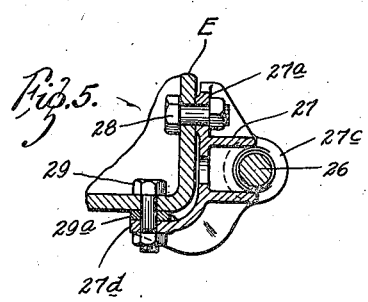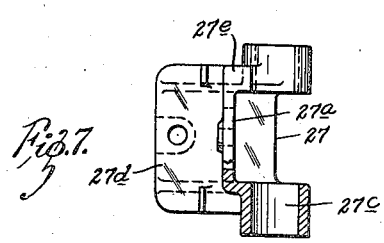

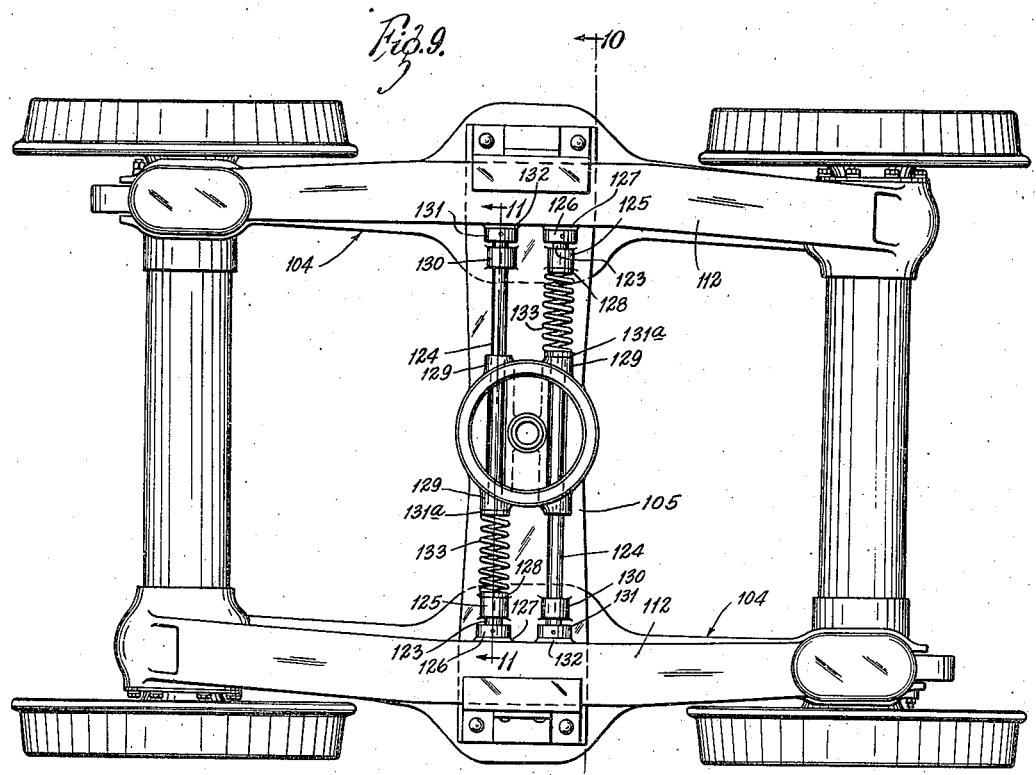
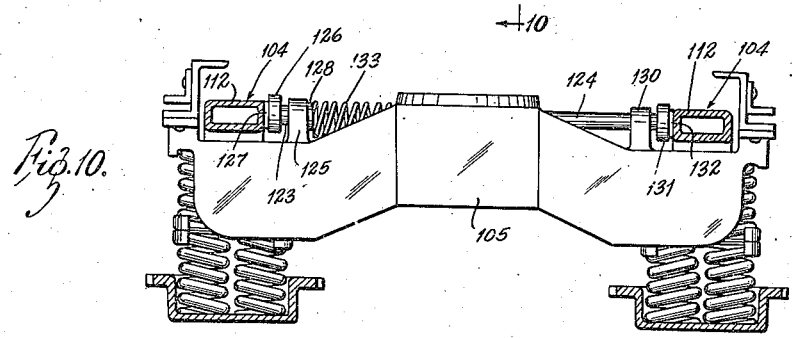
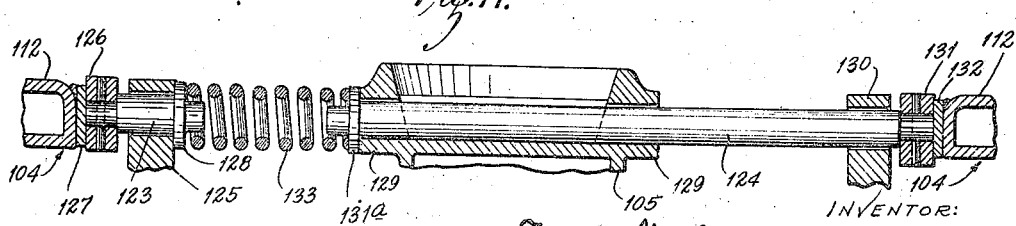

2,405,398

UNITED STATES PATENT OFFICE 2,405,398

CAR TRUCK

Tracy V. Buckwalter, Massillon, Ohio, assignor to The Timken Roller Bearing Company, Canton, Ohio, a corporation of Ohio Application April 20, 1944, Serial No. 531,848

7 Claims. (Cl. 105—193)

1

This application is a continuation-in-part of each of my copending applications Serial Nos. 424,692 and 424,693, filed December 29, 1941, each for patent for Car truck, which applications have since matured into U. S. Patents Nos. 2,352,162 and 2,352,163, granted June 27, 1944.

This invention relates to car trucks of the kind wherein the bolster is spring supported from the side frames and is adapted for limited bodily movement laterally thereof. The principal object of the present invention is to provide a strong and durable, simple and inexpensive arrangement for a truck of the above type that will check or cushion the excessive lateral motion of the truck bolster and thereby prevent lateral blows and shocks from being transmitted to the truck side frames, axle bearings and wheel flanges and that will return the parts to original position under normal running conditions. The invention consists in the lateral motion resistance device and in the construction, combinations and arrangements of parts hereinafter described and claimed.

In the accompanying drawings which form part of this specification and wherein like symbols refer to like parts wherever they occur, Fig. 1 is a plan view of a railway car truck provided with a lateral motion resistance device embodying my invention, Fig. 2 is a side elevational view of said car truck, Fig. 3 is an enlarged fragmentary vertical cross-sectional view on the line 3—3 in Fig. 1, Fig. 4 is a fragmentary plan view of the parts shown in Fig. 3, Fig. 5 is a fragmentary vertical sectional view on the line 5—5 in Fig. 3, Fig. 6 is a similar cross-sectional view on the line 6—6 in Fig. 3, Fig. 7 is a part plan and part horizontal sectional view of one of the supporting brackets for the lateral motion resisting device, Fig. 8 is a perspective view of the filler plate used with said supporting bracket, Fig. 9 is a plan view of a truck provided with the modified form of lateral resistance device, Fig. 10 is a vertical cross-sectional view on the line 10—10 in Fig. 9; and Fig. 11 is an enlarged fragmentary vertical section on the line 11—11 in Fig. 9.

In the accompanying drawings, my invention is shown embodied in a spring-plankless inboard railway car truck comprising a pair of roller bearing axle constructions A having wheels B at the ends thereof, side frames D connecting said axle constructions inwardly of said wheels and a cross beam or truck bolster E extending from side frame to side frame midway of the ends of said truck.

Each truck side frame D comprises a truss structure including a compression member 13 and a tension member 14 that converge towards the ends of said side frame and are connected midway of said ends by a pair of spaced upright bolster or column guides 15 that form a double strut between said compression and tension members and cooperate therewith to form an opening adapted to receive the adjacent end of the truck bolster E. The truck bolster has an upstanding center plate ring 16 formed integral therewith midway of the ends thereof and is provided at each end with an inverted channel side bearing plate 18 that is riveted or otherwise rigidly secured to the top of said bolster. This side bearing member is mounted on the bolster with its downwardly opening channel disposed crosswise thereof and straddling the middle, bolster opening forming portion of the upper or compression member 13 of the truck side frame.

The truck bolster E has each end thereof yieldably supported in the bolster opening of an adjacent side frame D for vertical movement thereto preferably by means of an upper nest or group of coil springs 20 and a large single lower coil spring 21. The lower spring 21 seats in a circular pocket or well 22 provided therefor in the portion of the side frame tension member that forms the bottom of the bolster opening; and the upper group or nest of springs 20 seats in a pocket 23 provided therefor in the underside of the bolster and is supported on a spring plate or follower 24 which, in turn, is supported on the upper end of the single coil spring 21.

The truck is provided on opposite sides of the bolster E with lateral motion resisting devices. Each of these devices comprises two spaced axially alined horizontal bars or rods 26 that are mounted on the bolster for independent sliding axial movement crosswise of the truck. Each of these rods is slidably supported intermediate between its ends in a suitable supporting bracket 27 having an upstanding flange 27a that fits in a vertical groove 27b provided therefor in the adjacent side face of the truck bolster, is rigidly secured in said groove preferably by means of a horizontal bolt 28, and has a pair of spaced outstanding lugs 27c with alined openings therethrough through which said rod extends. The bracket 27 also has a horizontal bottom flange 27d that extends beneath the truck bolster and is secured to the underside thereof by a vertical bolt 29, a filler plate 29a being interposed between said flange and bolster to compensate for variations in the vertical dimensions of said bracket or bolster.

Interposed between the spaced adjacent ends of the two relatively movable axially alined rods 26 of each lateral motion device is a heavy, preloaded coil compression spring 30 which seats against collars 31 provided therefor on the opposing ends of said rod. The rods 26 are provided between their opposing ends and their supporting brackets 27 with rigid abutment collars 32 that are normally held by means of the coil spring 30 in abutting relation to the opposing or inner ends of said brackets; and the remote ends of said rod are provided beyond their supporting brackets with shoes 33 adapted upon relative lateral motion of the truck bolster and side frames to abut against wear plates 34 riveted or otherwise secured to the inner faces of the bolster guides or columns 15 of the respective truck side frames. As shown in the drawings, the upstanding flange 27a of the angle bracket 27 has lugs 27e at the upper corners thereof that seat on the truck bolster at the upper end of the vertical groove 27b therein; and said lugs, together with the bottom flange 27d of said bracket, prevent vertical movement of said bracket relative to said bolster due to the frictional resistance between the shoes 33 of the rods 26 and the wear plates 34 during relative vertical movement of said side plates and bolster.

The lateral control devices are of simple and economical construction and effectively cushion transverse shocks between the bolster and side frames and thus enable the truck to follow track irregularities without transmitting the heavy lateral thrust loads to the truck parts, roller bearings and wheel flanges. The supporting brackets 27 for the rods 26 of the lateral motion devices are securely bolted to the sides and bottom of the truck bolster and also engage said bolster in a manner that prevents relative movement of said brackets and bolster, thereby relieving said bolts of shearing strains caused by the heavy lateral thrusts and the frictional resistance between the outer ends of said rods and the side frames during relative vertical movement of said bolster and side frames.

The lateral motion resisting device shown in Figs. 9 to 11, inclusive, comprises two spaced axially alined horizontal bars or rods 123 and 124 mounted on the bolster 105 for independent axial sliding movement crosswise of the truck. The rod 123 is a relatively short rod that is slidably supported in a single upstanding lug 125 on the bolster and is provided at its side frame opposing end with a head 126 that is disposed in endwise abutting relation to a pad 127 welded to the inner side face of the compression member 112 of one side frame 104. The other end of the short rod 123 has a collar 128 rigid therewith that is disposed in abutting relation to the inner side face of the lug 125 for supporting said rod.

The other rod 124 is a relatively long rod that is slidably supported in lugs 129 and 130 formed on and spaced apart lengthwise of the bolster 105 and is provided at its side frame opposing end with a head 131 that is disposed in abutting relation to a pad 132 welded to the inner side face of the compression member 112 of the other side frame. The other or inner end of the long rod 124 has a collar 131a rigid therewith that is disposed in abutting relation to the supporting lug 129 for said rod. Interposed between the spaced adjacent ends of the two relatively movable rods 123 and 124 is a heavy, preloaded coil compression spring 133 which seats against the collars 128 and 131a on said ends of said rods and normally holds said collars against the opposing faces of the lugs 125 and 129, respectively. By this arrangement, transverse shocks between the side frames 104 and the bolster 105 are cushioned or dampened by the spring 133 of each lateral motion resisting device which also operates to return the parts to normal position.

Obviously, the hereinbefore described construction admits of considerable modification without departing from the invention. Therefore, I do not wish to be limited to the precise arrangements shown and described.

What I claim is:

1. A car truck comprising side frames having bolster openings therein, springs in said bolster openings, the bolster having its ends disposed in said bolster openings and supported on the springs therein, and means interposed between said bolster and side frames for yieldably resisting relative movement of said bolster and side frames laterally of said truck, said means comprising two spaced axially alined horizontal rods mounted on said bolster on each side of the longitudinal center line thereof for independent limited axial sliding movement thereon laterally of said truck, and a preloaded coil compression spring interposed between the spaced ends of said rods and normally yieldably holding them at the limit of their sliding movement in the direction of said side frames.

2. A car truck comprising side frames having bolster openings therein, springs in said openings, a bolster having its end supported in said bolster openings on the springs therein, and means for yieldably resisting relative movement of said bolster and side frames crosswise of said truck, said means comprising spaced axially alined duplicate rods extending crosswise of the truck and supported on each side of said bolster for axial sliding movement relative to each other, said rods being disposed with their remote ends in abutting relation to the inner faces of the respective side frames, abutments removably secured to said bolster for limiting the movement of said rods in the direction of the side frames, and a pre-loaded coil compression spring interposed between the spaced ends of said rods and normally holding said rods in engagement with said abutments.

3. A car truck comprising side frames having bolster openings therein, a bolster having its ends supported in said bolster openings, and means for yieldably resisting relative movement of said bolster and side frames laterally of said truck, said means comprising two spaced axially alined horizontally disposed rods extending crosswise of the truck and supported on said bolster for axial sliding movement relative to each other, said rods being disposed with their remote ends in abutting relation to the inner faces of the respective side frames, abutments on said bolster for limiting the movement of said rods in the direction of the side frames, and a compression spring interposed between the spaced ends of said rods and normally holding them in engagement with said abutments, said abutments comprising brackets secured to the vertical side face of said bolster and snugly fitting within vertical channels provided therefore in said vertical side face thereof.

4. A car truck comprising side frames having bolster openings therein, a bolster having its ends supported in said bolster openings, and means yieldably resisting relative movement of said bolster and side frames laterally of said truck, said means comprising two spaced axially alined horizontally disposed rods extending crosswise of the truck and supported on said bolster for axial sliding movement relative to each other, said rods being disposed with their remote ends in abutting relation to the inner faces of the respective side frames, abutments on said bolster for limiting the movement of said rods in the direction of the side frames, a compression spring interposed between the spaced ends of said rods and normally holding them in engagement with said abutments, said abutments comprising angle brackets bolted to the bottom and vertical side faces of said bolster and snugly fitting within vertical channels provided therefor in said vertical side faces thereof, said brackets having portions at the upper corners thereof that rest on seats provided therefor on said bolster at the upper end of the vertical channels therein, and a filler plate interposed between said bracket and the bottom of said bolster.

5. A car truck comprising side frames having bolster openings therein, a bolster having its ends supported in said bolster openings, and means for yieldably resisting relative movement of said bolster and side frames laterally of said truck, said means comprising two spaced axially alined horizontally disposed rods extending crosswise of the truck on each side of said bolster and supported on the latter for axial sliding movement relative to each other, shoes on the remote ends of said rods disposed in abutting relation to the inner faces of the respective side frames, abutments on said bolster for limiting the movement of said rods in the direction of the side frames, and a compression spring interposed between the spaced ends of said rods and normally holding them in engagement with said abutments, said abutments comprising brackets bolted to the vertical side face of said bolster and snugly fitting within vertical channels provided therefor in said vertical side face thereof, said rods having abutment collars rigid therewith that are normally held by said spring in abutting relation to the inner ends of said brackets.

6. A car truck comprising side frames having bolster openings therein, springs in said bolster openings, a bolster having its ends disposed in said bolster openings and supported on the springs therein, and means interposed between said bolster and said side frames for yieldably resisting relative movement of said bolster and side frames laterally of said truck, said means comprising two spaced axially alined, horizontally disposed rods extending crosswise of the truck and supported on said bolster on each side of the longitudinal center line thereof for axial sliding movement relative to each other and to said bolster and side frames, said rods being disposed with their remote ends in abutting relation to the inner faces of the respective side frames, abutments on said bolster for limiting movement of said rods relative thereto in the direction of the side frames, and a compression spring interposed between spaced ends of said rods and normally holding them in engagement with said abutments.

7. A car truck comprising side frames having bolster openings therein, springs resting on the bottoms of said bolster openings, a bolster having its ends disposed in said bolster openings and supported on the springs therein, and means interposed between said bolster and said side frames for yieldably resisting relative movement of said bolster and side frames laterally of said truck, said means comprising two spaced axially alined, horizontally disposed rods extending crosswise of the truck and supported on top of said bolster for axial sliding movement relative to each other and to said bolster and side frames, said rods having heads at their remote ends disposed in abutting relation to the inner faces of the respective side frames, said bolster having lugs on the top thereof for slidably supporting the respective rods and for limiting movement of said rods in the direction of said side frames, and a preloaded compression spring interposed between spaced ends of said rods and normally holding them in engagement with the supporting lugs therefor.

TRACY V. BUCKWALTER.